Patented Aug. 13, 1946

2,405,558

UNITED STATES PATENT OFFICE 2,405,558

TERPENE POLYMER

Joseph N. Borglin, Wilmington, Del., assignor to Hercules Powder Company, Wilmington, Del., a corporation of Delaware No Drawing. Application March 11, 1941, Serial No. 382,739

9 Claims. (Cl. 260—80)

This invention relates to hydrocarbon resins, and more particularly it relates to resins of that character derived from beta-pinene. It also relates to a method of preparing resin from beta-pinene.

Hydrocarbon resins are in general inert, and for that reason are suitable for many purposes for which resins containing oxygen linkages cannot be applied. However, hydrocarbon resins prepared from inexpensive raw materials have not been satisfactory because they have suffered from the disadvantages of being colored, or of discoloring rapidly, of being unstable, and of being insufficiently hard for most uses. In addition, they have frequently been toxic, or of an unpleasant odor. Thus, polymerized naphtha fractions discolor and are usually relatively soft. Polymerized aliphatic hydrocarbons are soft and usually lack stability because of their unsaturated nature. Polymers prepared from pinene, dipentene, and the like have been soft or liquid with the characteristics of a drying oil rather than a resin, or they have been colored, have darkened on standing and have been unstable in other respects.

It has been found that these disadvantages are overcome to a considerable extent by polymerizing beta-pinene by means of metal halide catalysts, particularly aluminum chloride. However, aluminum chloride and the like function by forming intermediate chemical compounds with the polymerizing beta-pinene. In removing the catalyst by washing or by alkaline decomposition, substantial elimination is readily achieved, but residual small quantities of chemically combined chlorine or chlorine complexes always remain. The residual catalytic elements have an adverse effect upon the quality of the resin in causing loss of clarity and darkening in color with time. Furthermore, they interfere with hydrogenation of the resin where this is attempted.

It is an object of this invention to provide hydrocarbon resins free of the disadvantages mentioned. It is a further object to provide a colorless, stable, non-toxic, solid resin. It is also an object to provide a resin with a high melting point and a high molecular weight. It is also an object to provide such a resin free of residual traces of catalyst. It is also an object to provide a resin which retains its clarity and which does not discolor over long periods of time. It is also an object to provide a method for the preparation of such a resin. Other objects will appear hereinafter.

These objects are accomplished in accordance with this invention by resin prepared by polymerizing beta-pinene by treatment with a fluoride of the non-metal, boron. Preferably, a liquid diluent reaction medium which is inert with respect to beta-pinene, and which is non-polymerizing under the reaction conditions, is employed. The resin is then separated from the boron fluoride catalyst and may be recovered from the reaction medium.

It has been found that beta-pinene is unique among the terpenes in its applicability to the process of this invention. It is much more reactive and forms hard, stable resins of very low color. Beta-pinene is particularly to be distinguished from pinene (sometimes referred to as alpha-pinene) which is incapable of forming the desired hard, colorless, stable polymers.

Beta-pinene is found in gum turpentine and usually comprises from about 5% to about 35% of the gum turpentine, the major portion being pinene. To obtain beta-pinene, a gum turpentine having a relatively high beta-pinene content, i. e. 20–35%, is subjected to distillation. Pinene, which has a lower boiling point than beta-pinene, distills off as a first fraction. At least one-third of the gum turpentine is removed as this first distillate before a beta-pinene fraction rich enough for the purposes of this invention will be obtained; a maximum of pinene is desirably removed. Preferably, the residue containing the beta-pinene is distilled further to remove the beta-pinene from higher boiling oxidized and color-forming compounds, small quantities of which are usually present in turpentine. The beta-pinene fraction so obtained will contain at least 50% beta-pinene, preferably over 85%, so as to insure the formation of the harder, more highly polymerized resin of this invention in good yield. The quantity of first distillate (pinene) removed from the particular gum turpentine will be at least sufficient to insure the formation of the harder, more highly polymerized resin of this invention in good yield. The quantity of first distillate (pinene) removed from the particular gum turpentine will be at least sufficient to insure the desired beta-pinene content in the beta-pinene fraction.

In order to obtain an outstandingly colorless high melting hard resin, the beta-pinene will be brought by fractionation of a gum turpentine to the high purity represented by a boiling range in which at least 90% of the material distills in a 2° C. range. Various investigators differ slightly as to the boiling point of beta-pinene. However, the 2° C. range will include 64° C. if distillation is carried out at 25 mm. absolute pressure, or if distillation is carried out according to A. S. T. M. specifications at 760 mm., it will include the temperature of 166.5° C. Fractionation under vacuum is preferred.

Polymerization of the beta-pinene to produce the resin in accordance with this invention is brought about by treatment with a fluoride of boron. Boron trifluoride is particularly suitable as it is very readily released by the resin formed, and as it is also easily handled because of its gaseous nature. However, other fluorides of boron such as hydrofluoboric acid; dihydroxy fluoboric acid; organo-boron fluoride complexes, as, for example, with acetic acid; and the like are suitable in providing resin free of the disadvantages of the usual catalyst residue.

Beta-pinene may be polymerized by mere addition of the boron fluoride catalyst to cold beta-pinene and catalyst then removed, preferably after dilution of the beta-pinene. However, beta-pinene is unique in its reactivity and reacts exothermically and with such speed as to render temperature control of the viscous to solid mass very difficult even when the beta-pinene is pre-chilled to its freezing point. A reaction diluent provides effective control and leads to preferred products.

The reaction diluent utilized will be a liquid which is inert with respect to the beta-pinene; i. e. it will be substantially unreactive therewith, and it will not polymerize to form a resin under the conditions of the reaction. The diluent will be a solvent for the polymerization catalyst, and preferably will dissolve beta-pinene and the resin produced therefrom. However, solvent action on the resin is not necessary. The reaction solvent maintains the reaction mixture as a workable dispersion, i. e. solution, soft gel, or slurry; and it aids in temperature regulation. Thus, a diluent which is liquid at the particular reaction temperature utilized will be chosen.

Suitable solvents which have been found to be inert with respect to the beta-pinene are such, for example, benzene, toluene, xylene, para-cymene, pentane, hexane, heptane, octane, petroleum ether, cyclohexane, methyl cyclohexane; and halogenated hydrocarbons such as methyl chloride, methyl bromide, methyl iodide, methylene dichloride, methylene dibromide, chloroform, ethyl chloride, ethyl bromide, ethylene dichloride, ethylidene dichloride, 1,2,2 - trichloroethylene, similar higher halogenated ethane derivatives, halogenated propanes, butanes, etc. The two types of solvents exemplified behave differently in the reaction. Chlorinated solvents liquid at temperatures below 0° C. and of the character mentioned aid in the formation of resins particularly high in melting point. They require less catalyst. Their solvent action upon the resin formed is limited; solidification or gelation of the reaction mixture dispersion occurs when they are used. The hydrocarbon solvents, especially benzene, toluene, and xylene, maintain the reaction mixture in the form of a fluid solution which greatly simplifies manipulation. The process according to this invention permits avoidance of chlorinated solvents even at temperatures of −20° C. and below to form hard colorless resins.

The polymerization reaction in accordance with this invention is desirably carried out at very low temperatures. The hard, substantially colorless, clear, stable resin of high melting point and high molecular weight which represents the product in accordance with this invention in its mose desirable form is obtained by conducting the polymerization at temperatures below about 0° C. The temperature will usually be held at below −20° C., and in certain cases it may be as low as −150° C. The present process is unique in that it may be carried out at any low temperature above that at which the particular reaction mixture being utilized freezes to a solid mass. However, it may be conducted at temperatures above 0° C. and as high as about 180° C., but resins formed at relatively high temperatures are of considerably less value than those formed at lower temperatures because of lower melting point and increased color. These disadvantages may be minimized somewhat by the use of beta-pinene of maximum purity where high reaction temperatures are maintained.

The reaction in accordance with this invention may be brought about by forming a solution, preferably saturated, of the fluoride of boron in the diluent and adding the beta-pinene slowly thereto. Alternatively, the polymerizing agent may be added to a beta-pinene solution. Thus, boron trifluoride for example, is conveniently introduced by bubbling it into a solution of beta-pinene until no more is absorbed by the solution.

The reaction in accordance with this invention is quite rapid and may in some cases be substantially instantaneous. Furthermore, the reactiotn is exothermic. Since appreciable rise in temperature is in general undesirable, pre-cooling of reaction mixture components, external cooling of the reaction mixture, vigorous agitation, and slow mixing of beta-pinene and catalyst are usually practiced.

Upon completion of the reaction, the catalyst is removed from the resin formed. This is conveniently accomplished by washing with water. Where polymerization is carried out in the preferred manner at temperatures well below 0° C., it is desirable to inactivate the catalyst with an alcohol such as ethyl alcohol at the low temperature, warm the mixture to above 0° C., and then wash with water. The alcohol in such cases will be added in an amount insufficient to precipitate the resin. Precipitation of the resin by the addition of a non-solvent also brings about separation from the catalyst. However, water washing, usually followed by washing with dilute aqueous alkali, i. e. sodium or potassium hydroxide, carbonate, or the like, is preferred for removing the catalyst.

The resin solution may be dried and passed through a bed of fuller's earth, filter cel, or other activated or inactivated absorbent earth, activated carbon, silica gel, Activated Alumina, or the like to remove traces of materials likely to form color in the resin. This treatment is desirable only where the beta-pinene utilized is not of highest purity.

The resin may be utilized in solution, or it may be recovered from a reaction medium by evaporation of associated volatile solvent, preferably at reduced pressure. When so recovered, it will be in the form of a glassy, hard resin. However, it is preferably recovered by precipitation brought about by the addition of a non-solvent such as alcohol, dioxan, acetone, methyl-ethyl ketone, and the like, to a solution of the resin. Recovered in this manner, the product is a white granular powder in an especially uniform, colorless pure form free of unreacted or partially polymerized material. Where the resin is not completely soluble in the reaction mixture, a solution is preferably first formed by adding solvent.

The yield of resin obtained from the beta-pinene is practically quantitative, and will in general be about 90% by weight of the original beta-pinene utilized. In small batches, losses are higher but yields will exceed about 80%. The process in accordance with this invention is distinguished by its high yield of product.

The resin in accordance with the present invention is characterized by having at most a slight color and by being substantially colorless when made under preferred conditions. The resin in accordance with this invention will have a color less than N on the rosin scale (U. S. Department of Agriculture Standard Glass Rosin Color Scale) in all cases. Where polymerization is carried out under the preferred conditions of below 0° C. the color will be less than X on the rosin scale, and will be substantially as colorless as water. The resin obtained is a hard resin and will be characterized by a drop melting point above about 100° C. in all cases, and will be characterized by a drop melting point in excess of 120° C. in the preferred form prepared at temperatures below 0° C. The molecular weight of the resin will be above about 1,000 as determined by the depression of freezing point of a benzene solution. The viscosity of a 1% solution in benzene or toluene will be at least about 1.05 times the viscosity of the solvent alone. The resin is soluble in benzene, toluene, xylene, gasoline, ethyl ether, and butyl stearate; partly soluble in drying oils such as tung oil and linseed oil and in ethylene dichloride; and substantially insoluble in alcohol, low boiling ketones such as acetone, and in castor oil.

The resin in accordance with this invention is substantially stable but not saturated. However, it is within the scope of this invention to hydrogenate the polymerized beta-pinene to decrease this unsaturation. Where desired, hydrogenation may be continued to substantially complete saturation. Hydrogenation has the particular merit of increasing the melting point of the resin, the increase obtained being of an order of 20–30° C. in drop melting point. The method in accordance with this invention provides a resin particularly easy to hydrogenate. The adverse effects of residual catalyst obtained when agents like aluminum chloride are used are not encountered. As a result, a more saturated hydrogenated product is readily obtained, hydrogenation time may be reduced, and catalyst life is lengthened.

Hydrogenation may be conveniently carried out by subjecting the beta-pinene resin in solution in an inert solvent such as hexane, cyclohexane, methylcyclohexane, or benzene, or in the molten state, to hydrogen in the presence of a hydrogenation catalyst. Suitable hydrogenation catalysts are such noble metal catalysts as platinum, platinum oxide, palladium, palladium oxide, and the like, and such base metal catalysts as finely divided nickel, nickel-copper, or activated Raney nickel, and the like. Utilizing a noble metal catalyst, for example, the beta-pinene resin may be subjected to hydrogen at a pressure of about one atmosphere at a temperature between about 10° C. and about 40° C. for from about 2 to about 16 hours. Alternatively, utilizing a base metal catalyst, for example activated Raney nickel catalyst, the beta-pinene resin may be subjected to hydrogen at a pressure between about 200 and about 10,000 pounds per square inch at a temperature between about 120° C. and about 200° C. for a period of time between about 0.5 and about 6 hours. A particularly convenient procedure for preparing hydrogenated resins involves treating a solution of beta-pinene in a solvent suitable for both polymerization and hydrogenation, for example methyl cyclohexane, with the polymerization catalyst, removing the catalyst from the resin formed, and then hydrogenating the resin directly in the washed solution form.

The examples following will illustrate the method and product in accordance with this invention by presenting specific embodiments thereof. All parts and percentages are by weight unless otherwise specified.

*Example I*

A mixture of 26.2 parts of purified beta-pinene having a 2° C. boiling range at an absolute pressure of 25 mm. of mercury and 93.5 parts of methylene dichloride was chilled to a temperature of −40° C. Boron trifluoride was then slowly bubbled into the mixture while strongly agitating and cooling to prevent rise in temperature. The temperature rose rapidly to −20° C. and was then brought back to approximately −40° C. by the cooling. The reaction appeared to be substantially complete in a few minutes as indicated by the initial temperature rise. However, the boron trifluoride was added continuously until no more appeared to be absorbed, and the reaction mixture was agitated at about −40° C. for approximately 3½ hours. The resin formed in the reaction mixture took the form of a gel which behaved as a slurry under agitation. The mixture was then washed with a large volume of water which raised the temperature of the solution to above 0° C. and at the same time inactivated and removed the catalyst. The water wash was followed by a wash with 5% sodium hydroxide and water and a wash with pure water. The resin was then recovered from the dispersion by stirring it into a large volume of ethyl alcohol. Twenty-one and four-tenths parts of white powdered resin having a drop melting point of 134° C. and a molecular weight of 3,000 as determined by the depression of the freezing point of benzene were obtained. A 1% solution of the resin in benzene had a viscosity of 1.072 times the viscosity of the benzene.

*Example II*

A solution consisting of 26.2 parts of purified beta-pinene boiling in a 2° C. range at 25 mm. absolute pressure and 60.6 parts of toluene was chilled to a temperature of −60° C. Boron trifluoride was then bubbled into this solution while vigorously agitating it and strongly cooling it to maintain the temperature as near to −60° C. as possible. The reaction was substantially complete in less than 10 minutes as indicated by the tendency of the temperature to rise. However, the addition of boron trifluoride was continued until no more appeared to be absorbed, and the reaction mixture was held at −60° C. for about 45 minutes. The reaction mixture was then washed by mixing it with a large volume of water which simultaneously raised its temperature to about 0° C. and inactivated and removed the boron trifluoride catalyst. The resin solution so obtained was washed with a 5% solution of sodium hydroxide and again washed with water. The resin was then recovered by precipitation accomplished by mixing the washed solution with a large volume of ethyl alcohol. A white powdered resin having a drop melting point of 129° C. and a molecular weight as determined by the depression of the freezing point of benzene of 2,100 was obtained. A 1% solution in benzene had a viscosity of 1.047 times the viscosity of the pure benzene used as the solvent.

Example III

A solution consisting of 150 parts of beta-pinene of the type utilized in Example I and 534 parts of methylene dichloride was cooled to −50° C. Boron trifluoride was slowly bubbled into this solution while vigorously agitating it and applying strong external cooling to maintain the temperature as nearly as possible to −50° C. The addition of boron trifluoride was discontinued when no more appeared to be absorbed by the reaction mixture. The mixture was then held with continued agitation at approximately −50° C. for 3½ hours. The reaction mixture became a slurry or dispersion of gelatinous particles of resin as the resin formed. It was then washed with a large excess of water to inactivate and remove catalyst. The dispersion was then washed with a 5% sodium hydroxide and water solution and with pure water. The batch was then divided into two parts.

The resin was recovered from the first part by distilling volatile material therefrom up to a temperature of 210° C. to recover a glassy, substantially colorless resin having a drop melting point of 134° C. and a molecular weight as determined by the depression of the freezing point of benzene of 2,100. Forty-five and seven-tenths parts were so recovered. The viscosity of a 1% solution of this resin in benzene was 1.060 times the viscosity of the benzene. The resin had a color of 4 units Amber on the Lovibond scale measured on a 50 mm. depth of a 50% solution of the resin in pure toluene. On this color scale WW (so-called water white) wood rosin has a color value of 34 Amber units.

The second portion of the washed resin dispersion was stirred into a large excess of ethyl alcohol bringing about precipitation of the resin as a white powder in a quantity of 87.5 parts. The resin so obtained had a drop melting point of 137° C. and a molecular weight as determined by the freezing point depression of benzene of 2,600. The viscosity of a 1% solution of the resin in benzene was 1.065 times the viscosity of the benzene. A 50% solution in toluene had a color of 3 units Amber determined as hereinabove mentioned.

Example IV

The resin prepared in Example III and recovered by precipitation with alcohol was dissolved in cyclohexane in the proportion of 50 parts of resin in 200 parts of cyclohexane. This solution was subjected to hydrogen at 210° C. under a pressure of 1,500 pounds per square inch of hydrogen for 18 hours while in contact with activated Raney nickel catalyst. The resulting resin was recovered from solution by distilling off volatile material up to a temperature of 240° C. In this manner, a brilliantly clear, water-white product perfectly stable at 240° C. was obtained. The hydrogen absorbed during hydrogenation was 1.2% by weight of the resin hydrogenated. The hydrogenated product had a drop melting point of 161° C. and a molecular weight as determined by the freezing point depression of benzene of 2,750. The viscosity of a 1% solution in benzene was 1.053 times the viscosity of the benzene. The color of a 50% solution in pure toluene was 0.25 units Amber determined as hereinabove mentioned. It will be noted that hydrogenation gave a product to all practical purposes absolutely devoid of color and materially raised the melting point.

Example V

A mixture consisting of 26.2 parts of a beta-pinene cut and 93.5 parts of methylene dichloride was held at a temperature fluctuating between 26° C. and 45° C. by strong agitation and external cooling while boron trifluoride was slowly bubbled therethrough. Boron trifluoride was bubbled through the gelatinous dispersion which formed until no more appeared to be absorbed. The dispersion was held in the indicated temperature range approximately 2 hours, and the resin so formed was then recovered from the dispersion by precipitation with a large excess of ethyl alcohol. A moderately soft resin having a slight Amber color was obtained.

Example VI

A mixture consisting of 150 parts of purified beta-pinene boiling within a range of 2° C. at an absolute pressure of 25 mm. and 375 parts of toluene was chilled to a temperature of −60° C. Boron trifluoride was slowly bubbled through the solution with strong agitation and strong external cooling to hold the temperature as near to −60° C. as possible. The addition of boron trifluoride was discontinued when no more appeared to be absorbed, and the reaction mixture was held at about −60° C. for 3 hours. A small quantity of alcohol was then added to inactivate the catalyst and the temperature of the solution was permitted to rise to 0° C. It was then washed with a large amount of water, then with 5% sodium hydroxide solution, and again with water to remove the catalyst.

The solution was then split into two parts. Resin was recovered from the first part by distilling up to 210° C. to remove volatile material. Eighteen and eight-tenths parts of a glassy resin substantially water white was obtained. This resin had a color of 5 units Amber in 50% toluene solution determined as hereinabove described, and its viscosity in 1% solution in benzene was 1.056 times the viscosity of the benzene. The resin was recovered from the second solution in a quantity of 92.1 parts by precipitation using a lareg excess of ethyl alcohol. The resin was recovered in the form of a white powder. It had a drop melting point of 129° C., a molecular weight of 1,870, a color in 50% solution of 2 units Amber, and a viscosity in 1% benzene solution which was 1.054 times the viscosity of the benzene.

The resins in accordance with this invention are thermoplastic and may be utilized in the plastic arts to form molded articles by injection, compression, etc. They are also suitable as resin components in lacquers and varnishes to which they contribute gloss and adhesion. The resins may be coated per se from solvents, toluene for example, to form a film by evaporation of the toluene. The films so obtained are hard, adherent, very glossy, and resistent to mechanical abuse. They are particularly characterized by complete freedom from surface tack.

It will be understood that the details and examples hereinbefore set forth are illustrative only and that the invention as broadly described and claimed is in no way limited thereby.

What I claim and desire to protect by Letters Patent is:

1. The method of preparing a hard stable resin of color below about 5 Amber which comprises bringing a beta-pinene terpene fraction containing beta-pinene in excess of 50% of the terpenes present into reactive contact at a temperature below about 0° C. with a fluoride of boron as a polymerization catalyst to form a resin polymer of beta-pinene having a drop melting point above about 120° C. and a molecular weight above about 1000, and separating the catalyst from the said resin.

2. The method of preparing a hard stable resin of color below about 5 Amber which comprises bringing a beta-pinene terpene fraction containing beta-pinene in excess of 50% of the terpenes present into reactive contact at a temperature below about 0° C. with a fluoride of boron as a polymerization catalyst in a liquid reaction medium inert to beta-pinene and non-polymerizing under the conditions of the reaction to form a dispersion of a resin polymer of beta-pinene having a drop melting point above about 120° C. and a molecular weight above about 1000, and separating the catalyst from the said resin.

3. The method of preparing a hard stable resin of color below about 5 Amber which comprises bringing a beta-pinene terpene fraction containing beta-pinene in excess of 50% of the terpenes present into reactive contact at a temperature below about 0° C. with a fluoride of boron as a polymerization catalyst in a liquid reaction medium inert to beta-pinene and non-polymerizing under the conditions of the reaction to form a dispersion of a resin polymer of beta-pinene having a drop melting point above about 120° C. and a molecular weight above about 1000, separating the catalyst from the said resin, and hydrogenating the resin to form a saturated resin whose drop melting point is at least 20° C. higher than before hydrogenation.

4. The method of preparing a hard stable resin of color below about 5 Amber which comprises bringing a beta-pinene terpene fraction containing beta-pinene in excess of 50% of the terpenes present into reactive contact at a temperature below about 0° C. with boron trifluoride as a polymerization catalyst in a liquid reaction medium inert to beta-pinene and non-polymerizing under the conditions of the reaction to form a dispersion of a resin polymer of beta-pinene, having a drop melting point above about 120° C. and a molecular weight above about 1000, and separating the catalyst from the said resin.

5. The method of preparing a hard stable resin of color below about 5 Amber which comprises bringing a beta-pinene terpene fraction containing beta-pinene in excess of 50% of the terpenes present into reactive contact at a temperature below about 0° C. with boron trifluoride as a polymerization catalyst in a liquid reaction medium inert to beta-pinene and non-polymerizing under the conditions of the reaction to form a dispersion of a resin polymer of beta-pinene having a drop melting point above about 120° C. and a molecular weight above about 1000, separating the catalyst from the said resin, and hydrogenating the resin to form a saturated resin whose drop melting point is higher than before hydrogenation.

6. A method of preparing a hard stable resin of color below about 5 Amber which comprises bringing beta-pinene at least 90% of which distills in a 2° C. boiling range including 64° C. at an absolute pressure of 25 mm. of mercury into reactive contact at a temperature below about 0° C. with a fluoride of boron as a polymerization catalyst in a liquid reaction medium inert to beta-pinene and non-polymerizing under the conditions of the reaction to form a dispersion of a resin polymer of beta-pinene having a drop melting point above about 120° C. and a molecular weight above about 1000, and separating the catalyst from the said resin.

7. A method of preparing a hard stable resin of color below about 5 Amber which comprises bringing beta-pinene at least 90% of which distills in a 2° C. boiling range including 64° C. at an absolute pressure of 25 mm. of mercury into reactive contact at a temperature below about 0° C. with a fluoride of boron as a polymerization catalyst in a liquid reaction medium inert to beta-pinene and non-polymerizing under the conditions of the reaction to form a dispersion of a resin polymer of beta-pinene having a drop melting point above about 120° C. and a molecular weight above about 1000, separating the catalyst from the said resin and hydrogenating the resin to form a saturated resin whose drop melting point is at least 20° C. higher than before hydrogenation.

8. The method of preparing a hard stable resin of color below about 5 Amber which comprises bringing a beta-pinene terpene fraction containing beta-pinene in excess of 50% of the terpenes present into reactive contact at a temperature below about 0° C. with boron trifluoride as a catalyst in a reactive solvent medium comprising a liquid chlorinated hydrocarbon to form a dispersion of a resin polymer of beta-pinene having a drop melting point above about 120° C. and a molecular weight above about 1000, and separating the catalyst from the said resin.

9. The method of preparing a hard stable resin of color below about 5 Amber which comprises bringing a beta-pinene terpene fraction containing beta-pinene in excess of 50% of the terpenes present into reactive contact at a temperature below about 0° C. with boron trifluoride as a catalyst in methylene dichloride as a reactive medium to form a dispersion of a resin polymer of beta-pinene having a drop melting point above about 120° C. and a molecular weight above about 1000, and separating the catalyst from the said resin.

JOSEPH N. BORGLIN.